United States Patent
Zhou et al.

(10) Patent No.: US 11,108,601 B2
(45) Date of Patent: Aug. 31, 2021

(54) METHOD FOR CONTROLLING GAIN OF MULTI-STAGE EQUALIZER OF SERIAL DATA RECEIVER

(71) Applicant: AMLOGIC (SHANGHAI) CO., LTD., Shanghai (CN)

(72) Inventors: Weihua Zhou, Shanghai (CN); Ming Shi, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/750,870

(22) Filed: Jan. 23, 2020

(65) Prior Publication Data

US 2020/0244492 A1   Jul. 30, 2020

(30) Foreign Application Priority Data

Jan. 25, 2019  (CN) .......................... 201910075706.7

(51) Int. Cl.
*H04L 25/03*  (2006.01)

(52) U.S. Cl.
CPC .............................. *H04L 25/03878* (2013.01)

(58) Field of Classification Search
CPC ........... H03H 21/0012; H03H 21/0027; H03H 21/0043; H03H 2021/0092; H03H 2021/0094; H03H 2021/0098; H04B 3/143–148; H04L 25/03828; H04L 25/03878; H04L 25/03885; H04L 25/03891; H04L 25/03949
USPC ....... 375/229–236, 346, 348, 350; 333/28 R; 708/322, 323
See application file for complete search history.

(56) References Cited

U.S. PATENT DOCUMENTS

| | | | | |
|---|---|---|---|---|
| 4,674,103 A * | 6/1987 | Chevillat | .............. | H04L 27/066 375/222 |
| 8,611,403 B1 * | 12/2013 | Ding | ..................... | G06F 1/3206 375/219 |
| 9,584,345 B1 * | 2/2017 | Baecher | ................... | H04Q 9/06 |
| 9,667,455 B1 * | 5/2017 | Levakov | .............. | H04B 7/0413 |
| 10,250,417 B1 * | 4/2019 | Sun | ................... | H04L 25/03885 |
| 2003/0053534 A1 * | 3/2003 | Sivadas | ............. | H04L 25/03885 375/229 |

(Continued)

FOREIGN PATENT DOCUMENTS

| CN | 102098248 A | 6/2011 |
|---|---|---|
| CN | 106656876 A | 5/2017 |

*Primary Examiner* — Young T. Tse
(74) *Attorney, Agent, or Firm* — Conley Rose, P.C.; J. Robert Brown, Jr.

(57) ABSTRACT

The invention comprises a method for controlling a gain of a multi-stage equalizer of a serial data receiver, applied to the serial data receiver, the serial data receiver comprising the multi-stage equalizer, wherein the method comprises the steps of: Step S1, enabling the serial data receiver to receive a set of serial data; Step S2, selecting a continuous first data sequence from the set of serial data according to a preset first rule; Step S3, selecting a continuous second data sequence from the first data sequence according to a preset second rule; Step S4, extracting a predetermined bit from the second data sequence; Step S5, calculating an equalization gain identifier of the data sequence by using each predetermined bit; and Step S6, controlling the gain value of the multi-stage equalizer according to the equalization gain identifier.

9 Claims, 3 Drawing Sheets

(56) References Cited

U.S. PATENT DOCUMENTS

| | | | |
|---|---|---|---|
| 2006/0121860 A1* | 6/2006 | Lee | H04L 25/03885 |
| | | | 455/130 |
| 2010/0124265 A1* | 5/2010 | Shakiba | H03H 21/0012 |
| | | | 375/232 |
| 2011/0051796 A1* | 3/2011 | Khayrallah | H04L 25/03305 |
| | | | 375/232 |
| 2011/0255638 A1* | 10/2011 | Khayrallah | H04L 27/38 |
| | | | 375/316 |
| 2017/0222848 A1* | 8/2017 | Sun | H04L 7/0012 |
| 2020/0244491 A1* | 7/2020 | Zhou | H04L 25/03178 |
| 2020/0274742 A1* | 8/2020 | Zou | H04L 25/03885 |

* cited by examiner

METHOD FOR CONTROLLING GAIN OF MULTI-STAGE EQUALIZER OF SERIAL DATA RECEIVER

CROSS-REFERENCE TO RELATED APPLICATIONS

The present application claims priority to and the benefit of Chinese Patent Application No. 201910075706.7 filed on Jan. 25, 2019, the entire content of which is incorporated herein by reference.

BACKGROUND OF THE INVENTION

Field of the Invention

The invention relates to the technical field of high-speed serial data receiver, and more particularly, to a method for controlling a gain of a multi-stage equalizer of a serial data receiver.

Description of the Related Art

The development of science and technology, along with the social progress, allows people to have higher requirements for a high-speed data transmission and a more accurate data transmission. And since serial data is one of the most commonly used methods for transmission of high-speed signals, the design of the serial data receiver becomes ever more important.

Since signals are located in a complex and changeable environment, the signals may be easily attenuated. Therefore, the gain of the multi-stage equalizer is controlled such that the attenuated signals are effectively compensated. In the prior art, the rate of the serial data is high, and the working frequency of a gain detection circuit of the multi-stage equalizer is a low-speed clock. Thus, when high-rate serial data is processed by using a clock domain of the working frequency, a part of the serial data has to be discarded. Moreover, due to the fact that there is a fixed ratio of the rate of the serial data to the working frequency, the part of data actually processed at the working frequency is a fixed interval in a serial data stream, so that a deviation may be found in the gain of the multi-stage equalizer, and the gain of the multi-stage equalizer may not be reasonably controlled by the current equalizer. As a result, the proper way to control the gain of the equalizer is of great importance.

SUMMARY OF THE INVENTION

Given that the foregoing problems exist in the prior art, the present invention provides a method for controlling a gain of a multi-stage equalizer of a serial data receiver. According to the method, data actually processed at a low working frequency are not fixed in periodic data in a serial data stream, so that the parameter adjustment is optimized, and the compatibility and the functional performance of the serial data receiver are improved.

The technical solution is as follows:

A method for controlling a gain of a multi-stage equalizer of a serial data receiver, applied to the serial data receiver, the serial data receiver comprising the multi-stage equalizer, wherein the method comprises the steps of: Step S1, enabling the serial data receiver to receive a set of serial data; Step S2, selecting a continuous first data sequence from the set of serial data according to a preset first rule; Step S3, selecting a continuous second data sequence from the first data sequence according to a preset second rule; Step S4, extracting a predetermined bit from the second data sequence; Step S5, calculating an equalization gain identifier of the data sequence by using each predetermined bit; and Step S6, controlling the gain value of the multi-stage equalizer according to the equalization gain identifier.

Preferably, in the above-mentioned method for controlling a gain of a multi-stage equalizer of a serial data receiver, wherein the preset first rule defined in Step S2 comprises: Step A1, passing through a sliding window having a length of m+1, the sliding window sliding backward from a start bit of the serial data by a preset step; and Step A2, extracting the serial data corresponding to the sliding window to act as the first data sequence.

Preferably, in the above-mentioned method for controlling a gain of a multi-stage equalizer of a serial data receiver, wherein the preset step is one bit.

Preferably, in the above-mentioned method for controlling a gain of a multi-stage equalizer of a serial data receiver, wherein the preset second rule in Step S3 comprises: Step B1, setting a plurality of sequence length values; Step B2, selecting a sequence length value from the plurality of sequence length values according to a preset third rule; and Step B3, selecting a continuous second data sequence from the first data sequence according to the sequence length value.

Preferably, in the above-mentioned method for controlling a gain of a multi-stage equalizer of a serial data receiver, wherein both the first data sequence and the second data sequence have a length greater than or equal to three bits.

Preferably, in the above-mentioned method for controlling a gain of a multi-stage equalizer of a serial data receiver, in Step S4, the predetermined bit is the third bit counting from the beginning of the second data sequence, and a data interval between the first bit and the second bit counting from the beginning of the data sequence, and/or the data interval is obtained by sampling the set of serial data at half rate.

Preferably, in the above-mentioned method for controlling a gain of a multi-stage equalizer of a serial data receiver, wherein in Step S5, the equalization gain identifier is calculated by means of exclusive OR operation.

Preferably, in the above-mentioned method for controlling a gain of a multi-stage equalizer of a serial data receiver, wherein Step S6 further comprises: when the equalization gain identifier is an increase identifier, decreasing the gain value of the multi-stage equalizer; and when the optimized equalization gain identifier is a decrease identifier, increasing the gain value of the multi-stage equalizer.

Preferably, in the above-mentioned method for controlling a gain of a multi-stage equalizer of a serial data receiver, wherein the preset third rule in Step B2 further comprises the steps of: Step C1, arranging each of the plurality of sequence length values according to the sequence length; Step C2, sequentially selecting one of the sequence length values, and each selected sequence length value is not repeated; or randomly selecting one of the sequence length values, and each selected sequence length value is not repeated.

Preferably, in the above-mentioned method for controlling a gain of a multi-stage equalizer of a serial data receiver, wherein sequentially selecting one of the sequence length values comprises the steps of: Step D1, counting the number of the sequence length values, and setting a corresponding serial number for each of the sequence length values according to a numerical value of each of the sequence length values; and Step D2, calculating the serial number of each currently selected sequence length value in the plurality of sequence length values using the following formula according to the number of the sequence length values, $$\begin{cases} A = 1, m = 1 \\ A = \dfrac{2^{m-1} - 1}{2^m - 1} \times n, m \geq 2 \end{cases};$$

wherein A represents the serial number of each currently selected sequence length value in the plurality of sequence length values, when A is not an integer, A is set to an integer closest to A and greater than A; m represents a current round of selection; and n represents the number of the sequence length values.

By adopting the above-mentioned technical solutions, the present invention has the beneficial effects that the gain value of the multi-stage equalizer is controlled by selecting a continuous first data sequence from the set of serial data, then selecting a continuous second data sequence from the first data sequence, and calculating an equalization gain identifier corresponding to the second data sequence. In this way, data actually processed at a low working frequency are not fixed in periodic data in a serial data stream, so that the parameter adjustment is optimized, and the compatibility and the functional performance of the serial data receiver are improved.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
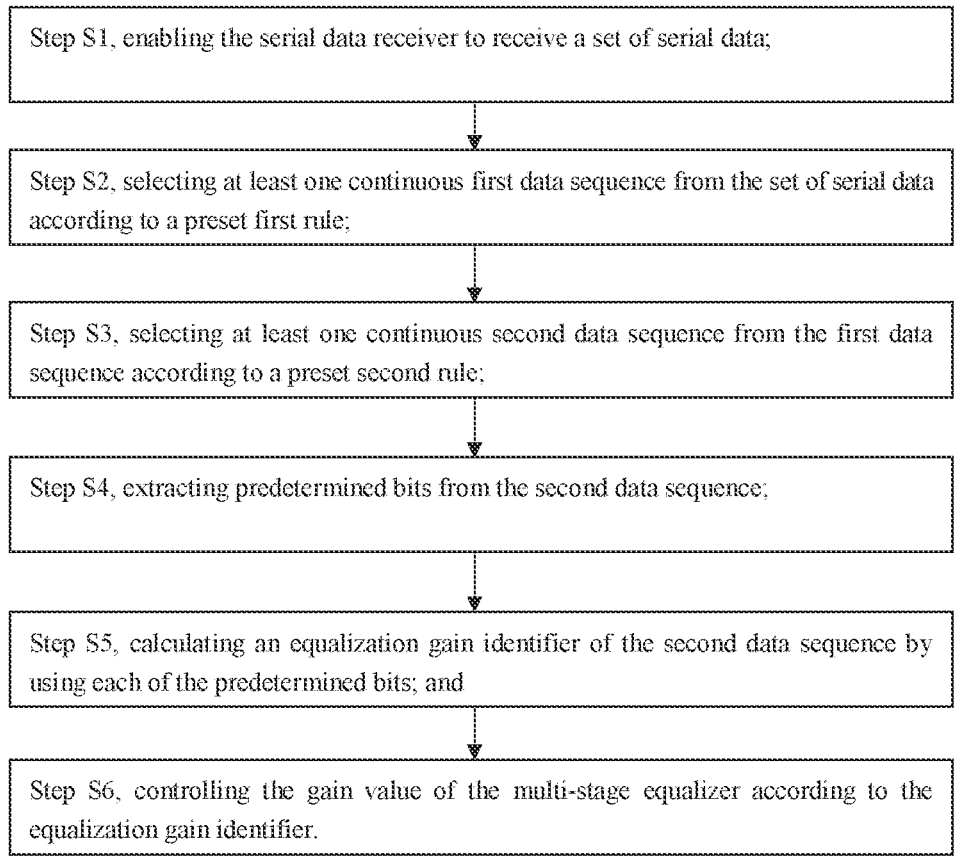
FIG. 1 is a flowchart illustrating a method for controlling a gain of a multi-stage equalizer of a serial data receiver according to an embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

The invention comprises a method for controlling a gain of a multi-stage equalizer of a serial data receiver, applied to the serial data receiver, the serial data receiver comprising the multi-stage equalizer, wherein as shown in FIG. 1, the method comprises the steps of: Step S1, enabling the serial data receiver to receive a set of serial data; Step S2, selecting a continuous first data sequence from the set of serial data according to a preset first rule; Step S3, selecting a continuous second data sequence from the first data sequence according to a preset second rule; Step S4, extracting a predetermined bit from the second data sequence; Step S5, calculating an equalization gain identifier of the data sequence by using each predetermined bit; and Step S6, controlling the gain value of the multi-stage equalizer according to the equalization gain identifier.

In the above-mentioned embodiment, a gain of a multi-stage equalizer is controlled by selecting a continuous first data sequence from the set of serial data, selecting a continuous second data sequence from the first data sequence, and calculating an equalization gain identifier corresponding to the second data sequence by extracting a predetermined bit from the second data sequence. In this way, data actually processed at a low working frequency are not fixed in periodic data in a serial data stream, so that the parameter adjustment is optimized, and the compatibility and the functional performance of the serial data receiver are improved.

Furthermore, as a preferred embodiment, the serial data receiver receives a set of serial data $D_{2m}$-$D_0$ (wherein, m is a natural number); then selecting a continuous first data sequence $D_m D_a$ from the set of serial data $D_{2m}$-$D_0$ according to a preset first rule, wherein the first data sequence $D_m D_a$ is any one of the continuous data sequences from the set of serial data $D_{2m}$-$D_0$; selecting a continuous second data sequence $D_n$-$D_o$ (wherein, n is a natural number) from the first data sequence $D_m D_a$ according to a preset second rule (wherein the second data sequence is any one of the continuous sequences from the first data sequence $D_mD_a$, for example, the second data sequence $D_n$-$D_o$ may be from the $7^{th}$ bit counting from the beginning of the first data sequence $D_mD_a$ to the $1^{st}$ bit counting from the beginning of the first data sequence $D_mD_a$, for example, the second data sequence $D_n$-$D_o$ may be from the $25^{th}$ bit counting from the beginning of the first data sequence $D_mD_a$ to the $13^{st}$ bit counting from the beginning of the first data sequence $D_mD_a$); and extracting predetermined bits from the second data sequence $D_n$-$D_o$ to sequentially calculate equalization gain identifiers corresponding to the second data sequence $D_n$-$D_o$; and finally, controlling the gain value of the multi-stage equalizer according to the equalization gain identifier. In this way, data actually processed at a low working frequency are not fixed in periodic data in a serial data stream, so that the parameter adjustment is optimized, and the compatibility and the functional performance of the serial data receiver are improved.

Figures 2, 3:
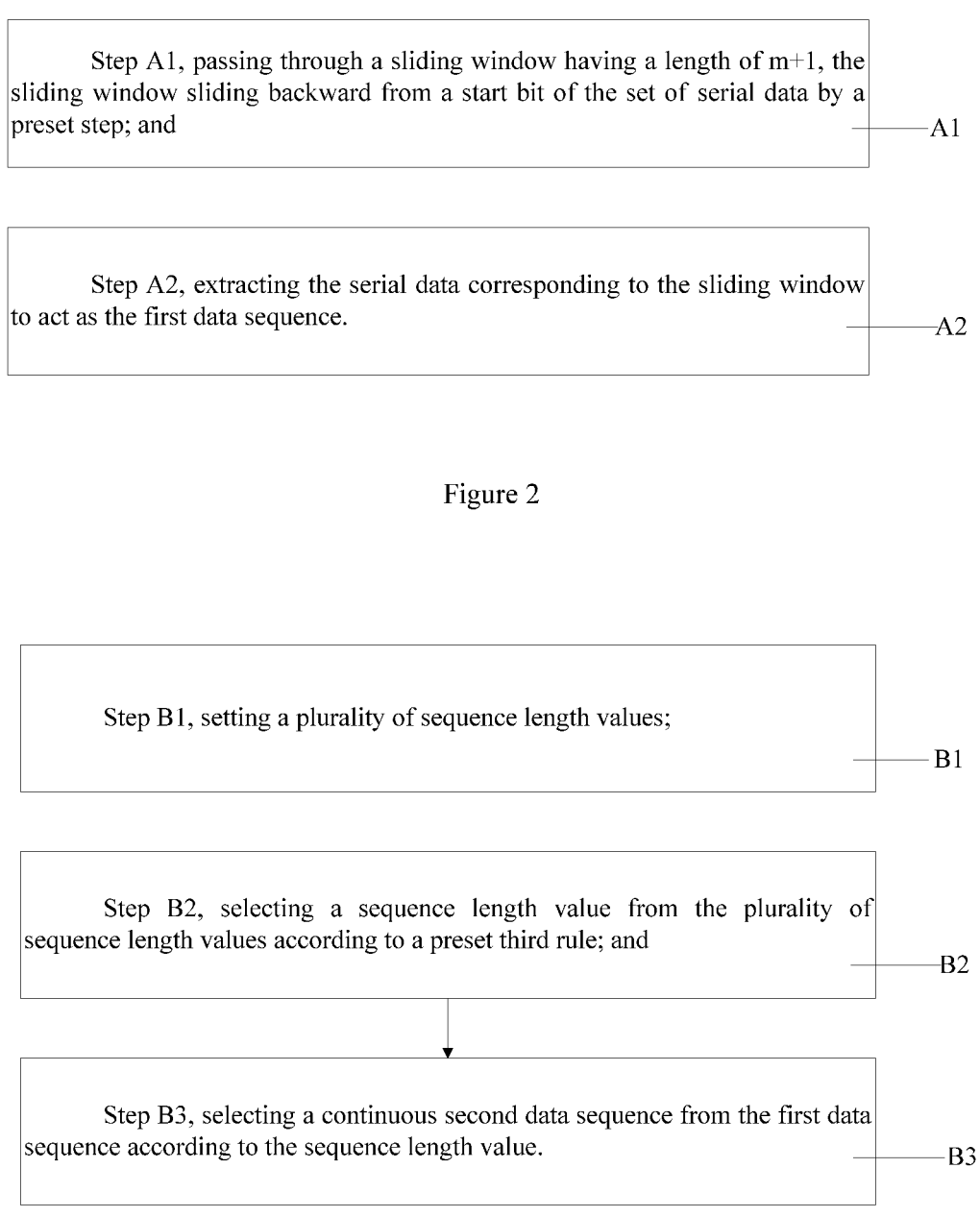
FIG. 2 is a flowchart illustrating a first rule of a method for controlling a gain of a multi-stage equalizer of a serial data receiver according to an embodiment of the present invention.
FIG. 3 is a flowchart illustrating a second rule of a method for controlling a gain of a multi-stage equalizer of a serial data receiver according to an embodiment of the present invention.

Furthermore, in the above-mentioned embodiment, as shown in FIG. 2, the preset first rule in Step S2 further comprises: Step A1, passing through a sliding window having a length of m+1, the sliding window sliding backward from a start bit of the set of serial data by a preset step; and Step A2, extracting the serial data corresponding to the sliding window to act as the first data sequence.

Furthermore, in the above-mentioned embodiment, the preset step is one bit.

Furthermore, as a preferred embodiment, the serial data receiver receives a set of serial data $D_{2m}$-$D_0$; then passing through a sliding window having a length of m+1 in the serial data $D_{2m}$-$D_0$, the sliding window sliding backward from a start bit of the set of serial data by a preset step; and extracting the serial data corresponding to the sliding window to act as the first data sequence. During this process, in order to make equalization gain identifier more accurate, it is necessary to extract the first data sequence for several times. And the sliding window corresponding to the first data sequence extracted each time may slide backward according to the preset step; for example, the first data sequence extracted for the first time is a first data sequence $D_m$-$D_0$; the first data sequence extracted for the second time is a first data sequence $D_{m+1}$-$D_1$; the first data sequence extracted for the third time is a first data sequence $D_{m+2}$-$D_2$; and so on; the first data sequence extracted for the $n^{th}$ time is a first data sequence $D_{m+n}$-$D_n$; so that data of the first data sequence extracted each time are not fixed in periodic data in a serial data stream.

Furthermore, in the above-mentioned embodiment, as shown in FIG. 3, the preset second rule in Step S3 further comprises: Step B1, setting a plurality of sequence length values; Step B2, selecting a sequence length value from the plurality of sequence length values according to a preset third rule; and Step B3, selecting a continuous second data sequence from the first data sequence according to the sequence length value.

Furthermore, as a preferred embodiment, the serial data receiver receives a set of serial data $D_{2m}$-$D_0$; then selecting a continuous first data sequence $D_n$-$D_0$ from the serial data $D_{2m}$-$D_0$ according to a preset first rule (wherein the first data sequence $D_n$-$D_0$ is any one of the continuous data sequences from the serial data $D_{2m}$-$D_0$); then setting a plurality of sequence length values for the first data sequence $D_n$-$D_0$, wherein the plurality of sequence length values comprise 7, 10, 13, and 15; for example, selecting a sequence length value 7 from the plurality of sequence length values (7, 10, 13, and 15) according to the preset third rule; then selecting the current continuous second data sequence $D_6$-$D_0$ from the set of serial data according to the selected sequence length value 7 (wherein the second data sequence is any one of the continuous sequences from the first data sequence $D_mD_a$, for example, the second data sequence $D_n$-$D_o$ may be from the $7^{th}$ bit counting from the beginning of the first data sequence $D_m$-$D_a$ to the $1^{st}$ bit counting from the beginning of the first data sequence $D_mD_a$, for example, the second data sequence $D_n$-$D_o$ may be from the $25^{th}$ bit counting from the beginning of the first data sequence $D_mD_a$ to the $13^{st}$ bit counting from the beginning of the first data sequence $D_m$-$D_a$); for example, selecting a sequence length value 10 from the plurality of sequence length values (7, 10, 13, and 15) according to the preset third rule; then selecting the current continuous second data sequence $D_9$-$D_0$ from the set of serial data according to the selected sequence length value 10; for example, selecting a sequence length value 13 from the plurality of sequence length values (7, 10, 13, and 15) according to the preset third rule; then selecting the current continuous second data sequence $D_{12}$-$D_0$ from the set of serial data according to the selected sequence length value 13; for example, selecting a sequence length value 15 from the plurality of sequence length values (7, 10, 13, and 15) according to the preset third rule; then selecting the current continuous second data sequence $D_{14}$-$D_0$ from the serial data according to the selected sequence length value 15; wherein, it should be noted that the number of the sequence length values may be set according to user requirements (in this embodiment, the number of the sequence length values is set to, but is not limited to 4); the selected sequence length values may be set according to user requirements (in this embodiment, the sequence length values are 7, 10, 13, and 15, respectively, however, other values are also contemplated), and the selection sequence may also be set according to user requirements.

Furthermore, in the above-mentioned embodiment, both the first data sequence and the second data sequence have a length greater than or equal to three bits.

Furthermore, in the above-mentioned embodiment, in Step S4, the predetermined bit is the third bit counting from the beginning of the second data sequence, and a data interval between the first bit and the second bit counting from the beginning of the second data sequence; in the above-mentioned embodiment, since in Step S4, the predetermined bit is the third bit counting from the beginning of the second data sequence, and a data interval between the first bit and the second bit counting from the beginning of the second data sequence, both the first data sequence and the second data sequence have a length greater than or equal to three bits.

Furthermore, in the above-mentioned embodiment, the data interval is obtained by sampling the serial data at half rate.

Furthermore, as a preferred embodiment, the serial data receiver receives a set of serial data $D_{2m}$-$D_0$; a data interval $B2_{m-1}$–$B_0$ of the serial data $D_{2m}$-$D_0$ is obtained by sampling the serial data $D_{2m}$-$D_0$ at half rate, wherein, the data interval $B_0$ is a data interval between the $1^{st}$ bit $D_0$ and the $2^{nd}$ bit $D_1$ counting from the beginning of the data sequences $D_{2m}$-$D_0$, and the serial data $D_{2m-1}$ is a data interval between the last bit $D_{2m}$ and the penultimate bit $D_{2m-1}$ counting from the beginning of the data sequences $D_{2m}D_0$.

Furthermore, in the above-mentioned embodiment, in Step S5, the equalization gain identifier is calculated by means of exclusive OR operation.

Furthermore, as a preferred embodiment, the serial data receiver receives a set of serial data $D_{2m}$-$D_0$; then selecting a continuous first data sequence $D_m$-$D_a$ from the serial data $D_{2m}$-$D_0$ according to a preset first rule (wherein the first data sequence $D_m$-$D_a$ is any one of the continuous data sequences from the serial data $D_{2m}$-$D_0$, wherein m≥a≥0, m≥3); selecting a continuous second data sequence $D_n$-$D_0$ from the first data sequence $D_m$-$D_a$ according to a preset second rule; then continue to select: the $3^{rd}$ bit $D_2$ counting from the beginning of the second data sequence $D_n$-$D_0$, and the data interval $B_0$ between the $1^{st}$ bit and the $2^{nd}$ bit counting from the beginning of the data sequence; for obtaining a more accurate result, a plurality of first data sequences may be selected, and one or more of the second data sequences may be selected from each of the plurality of first data sequences; in this embodiment, four second data sequences are obtained, that is, the second data sequence $D_6$-$D_0$, the second data sequence $D_9$-$D_0$, the second data sequence $D_{12}$-$D_0$, the second data sequence $D_{14}$-$D_0$; then calculating an equalization gain identifier corresponding to each of the second data sequences, as shown in Table 1 below:

TABLE 1

|  | $D_n$ | ... | $D_4$ | $D_3$ | $D_2$ | $D_1$ | $D_0$ | $B_0$ | Equalization gain identifier |
|---|---|---|---|---|---|---|---|---|---|
| First data sequence $D_6$-$D_0$ | 0 | 0 | 0 | 0 | 0 | 0 | 1 | 1 | 1 |
| Second data sequence $D_9$-$D_0$ | 0 | 0 | 0 | 0 | 0 | 1 | 0 | 1 | 1 |
| Third data sequence $D_{12}$-$D_0$ | 1 | 1 | 1 | 1 | 1 | 1 | 0 | 0 | 1 |
| Fourth data sequence $D_{14}$-$D_0$ | 1 | 1 | 1 | 1 | 1 | 0 | 1 | 1 | −1 |

It can be known from Table 1 that when the $3^{rd}$ bit $D_2$ counting from the beginning of the second data sequence $D_6$-$D_0$ is 0, and the data interval $B_0$ between the $1^{st}$ bit and the $2^{nd}$ bit counting from the beginning of the data sequence is 1, the equalization gain identifier is 1; when the $3^{rd}$ bit $D_2$ counting from the beginning of the second data sequence $D_9$-$D_0$ is 0, and the data interval $B_0$ between the $1^{st}$ bit and the $2^{nd}$ bit counting from the beginning of the data sequence is 1, the equalization gain identifier is 1; when the $3^{rd}$ bit $D_2$ counting from the beginning of the second data sequence $D_{12}$-$D_0$ is 1, and the data interval $B_0$ between the $1^{st}$ bit and the $2^{nd}$ bit counting from the beginning of the data sequence is 0, the equalization gain identifier is 1; when the $3^{rd}$ bit $D_2$ counting from the beginning of the second data sequence $D_{14}$-$D_0$ is 1, and the data interval $B_0$ between the $1^{st}$ bit and the $2^{nd}$ bit counting from the beginning of the data sequence is 1, the equalization gain identifier is −1; that is, when the $3^{rd}$ bit $D_2$ counting from the beginning of the second data sequence is equal to the data interval $B_0$ between the $1^{st}$ bit and the $2^{nd}$ bit counting from the beginning of the second data sequence, the obtained equalization gain identifier is −1; and when the $3^{rd}$ bit $D_2$ counting from the beginning of the second data sequence is not equal to the data interval $B_0$ between the $1^{st}$ bit and the $2^{nd}$ bit counting from the beginning of the second data sequence, the obtained equalization gain identifier is set to 1.

It is noted the value "1" or "−1" in the equalization gain identifier 1 or −1 does not represent concrete data, but represents an identifier, and other identifiers may be used to represent the equalization gain identifier.

$B_0$ of each data sequence in Table 1 may be 0 or 1, and data of each data sequence has eight possibilities. For example, data of the data sequence $D_6$-$D_0$ may have eight possibilities, as shown in Table 2 below:

TABLE 2

|  | $D_6$ | $D_5$ | $D_4$ | $D_3$ | $D_2$ | $D_1$ | $D_0$ | $B_0$ | Equalization gain identifier |
|---|---|---|---|---|---|---|---|---|---|
| Possibility 1 of data sequence $D_6$-$D_0$ | 0 | 0 | 0 | 0 | 0 | 0 | 1 | 0 | −1 |
|  |  |  |  |  |  |  |  | 1 | 1 |
| Possibility 2 of data sequence $D_6$-$D_0$ | 0 | 0 | 0 | 0 | 0 | 1 | 0 | 0 | −1 |
|  |  |  |  |  |  |  |  | 1 | 1 |
| Possibility 3 of data sequence $D_6$-$D_0$ | 1 | 1 | 1 | 1 | 1 | 1 | 0 | 0 | 1 |
|  |  |  |  |  |  |  |  | 1 | −1 |
| Possibility 4 of data sequence $D_6$-$D_0$ | 1 | 1 | 1 | 1 | 1 | 0 | 1 | 0 | 1 |
|  |  |  |  |  |  |  |  | 1 | −1 |

It can be known from Table 2 that data $D_6$-$D_2$ of the data sequence $D_6$-$D_0$ is continuous 0 or 1, wherein $B_0$ may be 0 or 1, therefore, the equalization gain identifier is also varied with $D_2$ and $B_0$.

Furthermore, in the above-mentioned embodiment, Step S6 further comprises: when the equalization gain identifier is an increase identifier, decreasing the gain value of the multi-stage equalizer; and when the optimized equalization gain identifier is a decrease identifier, increasing the gain value of the multi-stage equalizer.

Wherein, as a preferred embodiment, when the equalization gain identifier is 1, the equalization gain identifier may be set as the increase identifier; when the equalization gain identifier is −1, the equalization gain identifier may be set as the decrease identifier.

Figure 4:
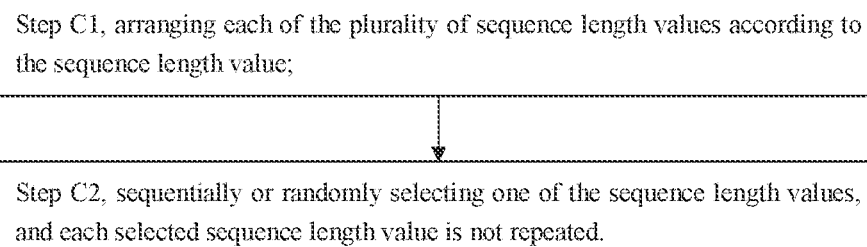
FIG. 4 is a flowchart illustrating a third rule of a method for controlling a gain of a multi-stage equalizer of a serial data receiver according to an embodiment of the present invention.

Furthermore, in the above-mentioned embodiment, as shown in FIG. 4, the preset third rule further comprises the steps of: Step C1, arranging each of the plurality of sequence length values according to the sequence length; Step C2, sequentially selecting one of the sequence length values, and each selected sequence length value is not repeated; or randomly selecting one of the sequence length values, and each selected sequence length value is not repeated.

Furthermore, in the above-mentioned embodiment, sequentially selecting one of the sequence length values comprises the steps of: Step D1, counting the number of the sequence length values, and setting a corresponding serial number for each of the sequence length values according to a numerical value of each of the sequence length values; Step D2, calculating the serial number of each currently selected sequence length value in the plurality of sequence length values using the following formula according to the number of the sequence length values, $$\begin{cases} A = 1, m = 1 \\ A = \dfrac{2^{m-1} - 1}{2^m - 1} \times n, m \geq 2 \end{cases};$$

wherein A represents the serial number of each currently selected sequence length value in the plurality of sequence length values, for the second equation, when A is not an integer, A is set to an integer closest to A and greater than A; m represents a current round of selection; and n represents the number of the sequence length values.

Furthermore, as a preferred embodiment, the serial data receiver receives a set of serial data $D_{2m}$-$D_0$; then selecting a continuous first data sequence $D_n$-$D_0$ from the serial data $D_{2m}$-$D_0$ according to a preset first rule (wherein the first data sequence $D_n$-$D_0$ is any one of the continuous data sequences from the serial data $D_{2m}$-$D_0$); setting a plurality of sequence length values for the first data sequence $D_n$-$D_0$, wherein the plurality of sequence length values comprise 3, 7, 10, 13, 15, 18, 20, 26, 36, 42, 45, and 49; setting a corresponding serial number for each of the sequence length values according to a numerical value of each of the sequence length values, that is, setting a serial number of 1 for the sequence length value 3, setting a serial number of 2 for the sequence length value 7, and setting a serial number of 3 for the sequence length value 10, and so on, and setting a serial number of 12 for the sequence length value 49; during the first round of selection, the sequence length value with a serial number 1 is selected, and the current continuous data sequence is selected from the set of serial data with the extracted sequence length value of 3; during the second round of selection, the sequence length value with a serial number 6 is selected, and the current continuous data sequence is selected from the set of serial data with the extracted sequence length value of 18; during the third round of selection, A is calculated to be equal to 10.5. Since A is not an integer, A is set to an integer closest to A and greater than A, that is A is set to 11; the sequence length value with a serial number 11 is selected, and the current continuous data sequence is selected from the set of serial data with the extracted sequence length value of 45; during the fourth round of selection, A is calculated to be equal to 11.25. Since A is not an integer, A is set to an integer closest to A and greater than A, that is A is set to 12; and the sequence length value with a serial number 12 is selected, and the current continuous data sequence is selected from the serial data with the extracted sequence length value of 49.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A method for controlling a gain of a multi-stage equalizer of a serial data receiver, applied to the serial data receiver, the serial data receiver comprising the multi-stage equalizer, wherein the method comprises the steps of:
   Step S1, enabling the serial data receiver to receive a set of serial data;
   Step S2, selecting at least one continuous first data sequence from the set of serial data according to a preset first rule;
   Step S3, selecting at least one continuous second data sequence from the first data sequence according to a preset second rule;
   Step S4, extracting predetermined bits from the second data sequence;
   Step S5, calculating an equalization gain identifier of the second data sequence by using each of the predetermined bits; and
   Step S6, controlling the gain value of the multi-stage equalizer according to the equalization gain identifier;
   wherein the preset first rule in Step S2 comprises:
   Step A1, passing through a sliding window having a length of m+1, the sliding window sliding backward from a start bit of the set of serial data by a preset step, m is an integer and greater than zero; and
   Step A2, extracting the serial data corresponding to the sliding window to act as the first data sequence.

2. The method for controlling the gain of the multi-stage equalizer of the serial data receiver of claim 1, wherein the preset step is one bit.

3. The method for controlling the gain of the multi-stage equalizer of the serial data receiver of claim 1, wherein the preset second rule in Step S3 comprises:
   Step B1, setting a plurality of sequence length values;
   Step B2, selecting a sequence length value from the plurality of sequence length values according to a preset third rule; and
   Step B3, selecting the at least one continuous second data sequence from the first data sequence according to the sequence length value.

4. The method for controlling the gain of the multi-stage equalizer of the serial data receiver of claim 3, wherein the preset third rule in step B2 further comprises the steps of:
   Step C1, arranging each of the plurality of sequence length values according to the sequence length value;
   Step C2, sequentially or randomly selecting one of the sequence length values, and each selected sequence length value is not repeated.

5. The method for controlling the gain of the multi-stage equalizer of the serial data receiver of claim 4, wherein sequentially or randomly selecting one of the sequence length values comprises the steps of:
   Step D1, counting the number of the sequence length values, and
   setting a corresponding serial number for each of the sequence length values according to a numerical value of each of the sequence length values; and
   Step D2, calculating the serial number of each currently selected sequence length value in the plurality of sequence length values using the following formula according to the number of the sequence length values, $$\begin{cases} A = 1, m = 1 \\ A = \dfrac{2^{m-1} - 1}{2^m - 1} \times n, m \geq 2 \end{cases};$$

wherein A represents the serial number of each currently selected sequence length value in the plurality of sequence length values,
for the second equation, when A is not an integer, A is set to an integer closest to A and greater than A;
m represents a current round of selection; and
n represents the number of the sequence length values.

6. The method for controlling the gain of the multi-stage equalizer of the serial data receiver of claim 1, wherein both the first data sequence and the second data sequence have a length greater than or equal to 3 bits.

7. The method for controlling the gain of the multi-stage equalizer of the serial data receiver of claim 1, wherein in Step S4, the predetermined bits are the third bit counting from the beginning of the second data sequence, and a data interval between the first bit and the second bit counting from the beginning of the second data sequence, and/or the data interval is obtained by sampling the set of serial data at half rate.

8. The method for controlling the gain of the multi-stage equalizer of the serial data receiver of claim 1, wherein in Step S5, the equalization gain identifier is calculated by means of exclusive OR operation.

9. The method for controlling the gain of the multi-stage equalizer of the serial data receiver of claim 1, wherein Step S6 further comprises:
   when the equalization gain identifier is an increase identifier, decreasing the gain value of the multi-stage equalizer; and
   when the equalization gain identifier is a decrease identifier, increasing the gain value of the multi-stage equalizer.

* * * * *